United States Patent [19]

Nevery

[11] 3,998,114
[45] Dec. 21, 1976

[54] MULTI-POSITION CARRIAGE STOP

[76] Inventor: Arpad Nevery, 1577 Edgefield Road, Lyndhurst, Ohio 44124

[22] Filed: Sept. 5, 1975

[21] Appl. No.: 610,641

[52] U.S. Cl. .............................................. 82/34 D
[51] Int. Cl.² ........................................ B23B 3/36
[58] Field of Search .................... 82/34 D, 34 A

[56] References Cited
UNITED STATES PATENTS

| | | | |
|---|---|---|---|
| 1,231,946 | 7/1917 | Schellenbach | 82/34 D |
| 2,674,139 | 4/1954 | Stern | 82/34 D |
| 2,731,870 | 1/1956 | Colman | 82/34 A |
| 3,545,320 | 12/1970 | Anderson | 82/34 D |

Primary Examiner—Leonidas Vlachos
Attorney, Agent, or Firm—William N. Hogg

[57] ABSTRACT

A carriage stop for lathes is disclosed. The carriage stop has a non-rotative spindle in which are circumferentially arranged a plurality of screws, each adjustable axially. A stop shaft is rotatably and slidably mounted on the spindle, selectively positionable in any one of a plurality of rotative positions. A collar is carried by the stop shaft having a plurality of openings, one less in number than the number of screws, and a stop surface. The stop shaft is selectively positionable axially depending upon the relative rotative position of the shaft which the stop surface on the collar with one of the screws, the axial position thereof determining the axial position of the stop shaft, the other screws passing through the openings in the collar.

5 Claims, 7 Drawing Figures

U.S. Patent  Dec. 21, 1976  Sheet 1 of 2  3,998,114
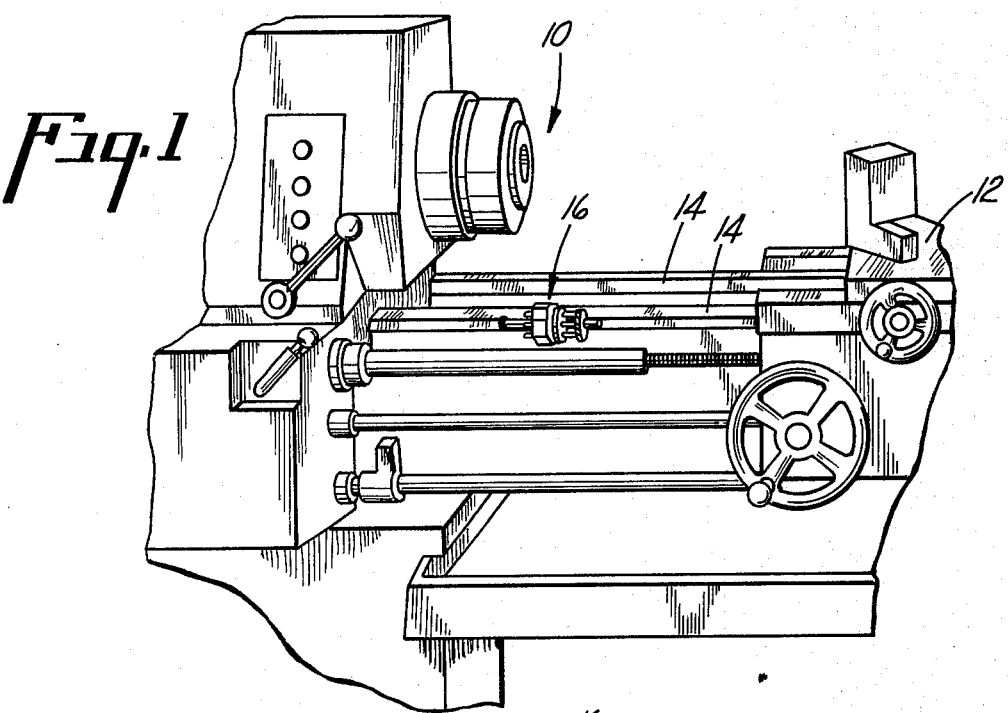
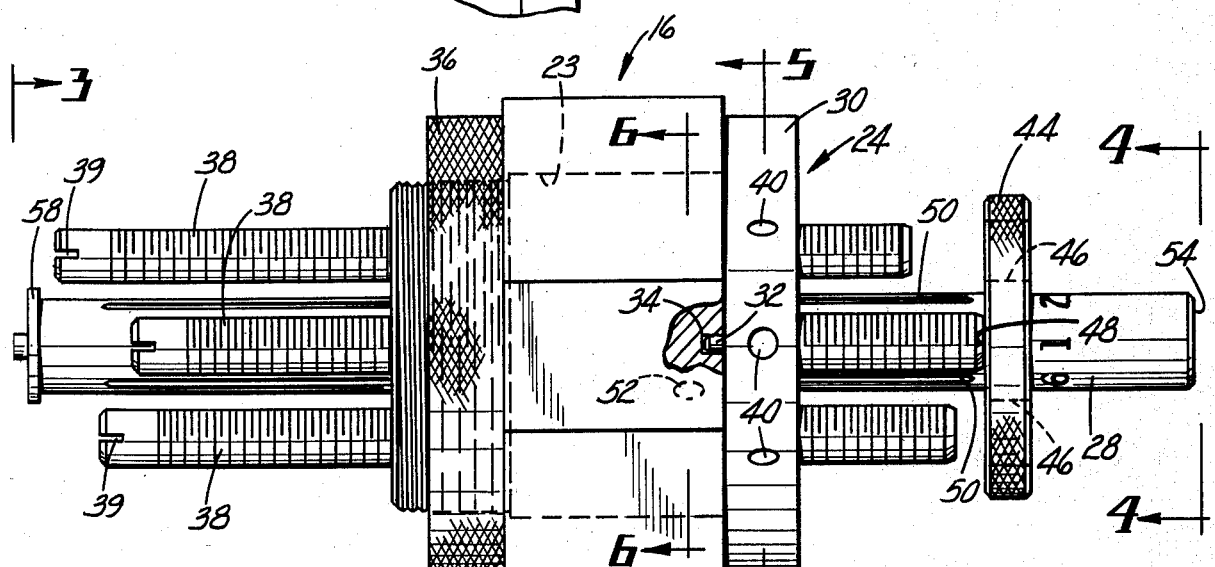
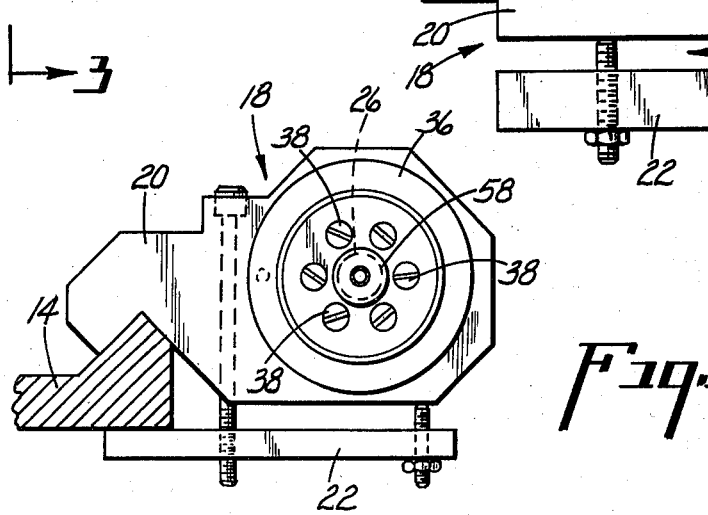
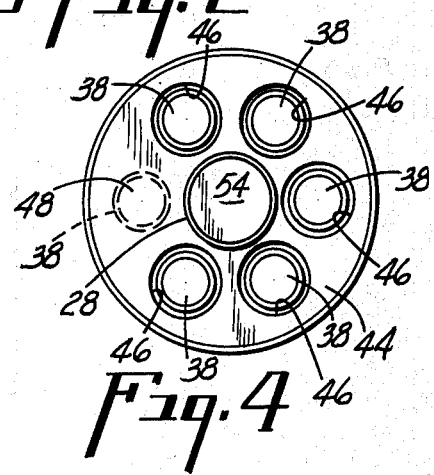

U.S. Patent  Dec. 21, 1976  Sheet 2 of 2  3,998,114
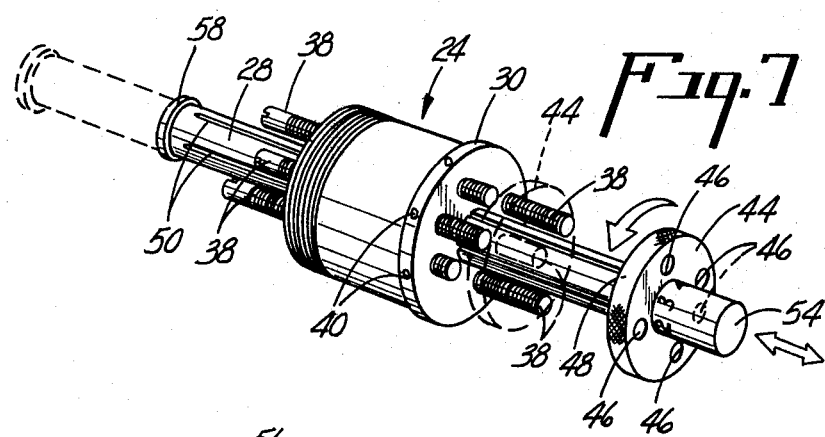
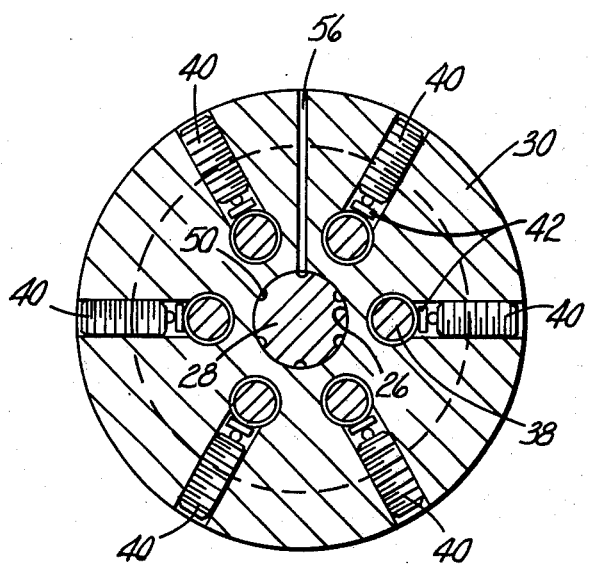
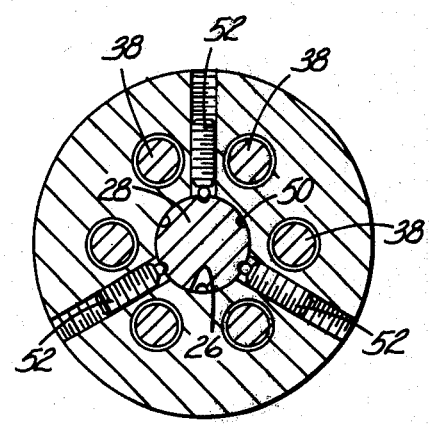

MULTI-POSITION CARRIAGE STOP

BACKGROUND OF THE INVENTION

This invention relates generally to carriage stops for lathes, and more particularly to such carriage stops which are selectively positionable to provide a plurality of different stop positions for lathe carriages.

There have been prior art proposals for selectively positionable carriage stops for lathes. These, however, in the main have relied on a rotatable spindle carrying adjustable stop screws therein which stop screws are positionable directly in the path of the lathe carriage with the ends of each screw abutting directly against the carriage. The spindle is rotated to present the desired adjusted screw in the path of the carriage. This type of arrangement has several disadvantages, the chief of which is the tendency of the screws to become bent and thus difficult to position for accurately limiting the exact position of carriage stop. Further, the position of this device on the lathe always had to provide for clearance of the unused screws with respect to the carriage so that unintended screws would not prematurely abutt the carriage. Further, with this type of device there were a plurality of stop surfaces abutting against the carriage, each stop surface being defined by the end of a screw, and this introduced the possibility of variation of stop locations.

SUMMARY OF THE PRESENT INVENTION

According to the present invention, a multi-position carriage stop for a lathe is provided. The carriage stop has a stationery spindle and means to mount the spindle on the lathe. A stop shaft is mounted on the spindle for axial and rotational movement, the shaft having a stop surface positioned in the path of the carriage of the lathe when the device is mounted on the lathe. Cooperating means are carried by the spindle and the shaft to selectively change the axial position of the shaft with respect to the spindle dependent upon the rotational position of the shaft. Hence by rotation of the shaft the axial position of the shaft can be adjusted to change the stop position of the carriage.

DESCRIPTION OF THE DRAWING

FIG. 1 is a perspective view of a portion of a lathe with a multi-position carriage stop device according to this invention mounted thereon;

FIG. 2 is an elevational view on an enlarged scale from FIG. 1 of the carriage stop device of this invention;

FIG. 3 is a view taken looking substantially along the plane designated by the line 3—3 of FIG. 2;

FIG. 4 is a view taken looking substantially along the plane designated by the line 4—4 of FIG. 2;

FIG. 5 is a sectional view taken substantially along the plane designated by the line 5—5 of FIG. 2;

FIG. 6 is a sectional view taken substantially along the plane designated by the line 6—6 of FIG. 2; and FIG. 7 is a perspective view of the device showing in solid line the device pulled to a position for adjusting and in phantom line the device adjusted in one of its given positions for stopping the carriage.

DESCRIPTION OF THE PREFERRED EMBODIMENT

Referring now to the drawing, and for the present to FIG. 1, a lathe designated generally as 10 is shown which has a carriage 12 mounted for reciprocal movement on ways 14. A multiple position carriage stop according to this invention is shown and designated generally by the reference character 16 mounted on one of the ways 14 of the lathe and positioned to coact with the carriage 12. (It is to be understood that this particular lathe is shown merely as environmental, and is representative of one type of lathe that can be utilized and is not intended to be a part of the invention per se.)

FIGS. 2 through 7 show the multiple position carriage stop 16 in greater detail. The carriage stop 16 includes a mounting bracket 18 which is configured to mount the stop on one of the ways 14 of the lathe. The mounting bracket 18 includes a housing member 20 and a clamp member 22 which are secured together and adjusted by means of screws (unnumbered) so as to securely mount the device in the desired position on a way 14.

The housing member 20 has a through bore 23 in which is disposed a spindle 24. The spindle in turn has a through axial bore 26 in which is mounted a stop shaft 28, the stop shaft 28 being slidably and rotatably mounted in the bore 26. The spindle 24 has an enlarged end flange 30. The flange 30 is provided with a locating pin 32 adapted to fit into a bottomed locating aperture 34 formed in the housing member 20 to thereby position the spindle 24 in the housing and prevent rotation thereof. A knurled lock nut 36 is threaded onto the threaded end of the spindle 24 at the opposite ends from the flange 30 to thereby snugly mount the spindle 30 in the housing member 20. The combination of the pin 32 and locating bore 34 and nut 36 threaded onto the end of the spindle cooperate to provide a stationery spindle 34 which when mounted in the housing is nonrotative and nonmovable axially.

Six adjustable stop screws 38 are provided which are circumferentially and radially equally spaced, threaded through the spindle 24 around the stop shaft 28. The stop screws 38 have screwdriver slots 39 in one end thereof for axial adjustment of each of the screws independently.

As can best be seen in FIG. 5, a plurality of ball plunger screws 40 are threaded into the flange 30 and abutt against brass discs 42 which in turn bear against the stop screws 38. The ball plunger screws 40 are conventional stock items which include spherical balls at the end thereof which are spring biased. This particular configuration of a ball plunger screw 40 and brass disc 42 bearing against stop screw 38 maintains the stop screw 38 in its precise adjusted position and prevents unintended rotation due to vibration or other factors thereby maintaining a precisely set position of each screw. The force exerted by the ball plunger screws 40 can be adjusted by a screwdriver to provide sufficient force to prevent this unintended rotational movement of the stop screws 38 but still allow the stop screws 38 to be adjusted by means of a screwdriver and the slots 39 for intended adjustment.

An enlarged collar 44 is provided near one end of the stop shaft 28. The collar 44 is provided with five through openings 46 circumferentially and radially arranged therearound, the openings being slightly larger than the size of the stop screws 38, and being spaced the same as the spacing of the screws 38 around the shaft 28. The five openings 46 in the collar 44 are separated by a stop surface 48 which is located at the location which the sixth opening would have occupied if it were formed therein to align with the sixth screw 38; i.e. there are five spaced openings 46 with the sixth position thereof being a stop surface without an opening, these openings and stop surface corresponding in position to the six stop screws 38.

The stop shaft 28 is provided with six longitudinally expanding grooves 50 and the spindle is provided with three circumferentially spaced radially extending detent ball plunger screws 52 shown in FIG. 6. These ball plunger screws 52 and grooves 50 are so positioned that upon rotation of the shaft 28 the ball plungers 52 and grooves 50 will coact to detent the shaft in six discrete positions. Further, each of these discrete positions is a position wherein the five openings 46 are in axial alignment with five of the stop screws 38 with the sixth stop screw 38 being in alignment with the stop surface 48 on the collar 44.

The shaft 28 terminates at one end with a stop surface 54 centered on the axis of rotation of the shaft and which, when the device is mounted on a lathe, lies in the path of the carriage 12 and thus will act as a stop surface to limit the travel of the carriage 12 dependent upon the position of the stop screws and the rotative position of the shaft 54, as will be explained presently. The shaft 28 has a number indicia therearound adjacent the collar, each number corresponding to one of the rotative positions of the shaft.

In order to complete the construction, an oil drilling 56 is provided extending through the flange 30 to allow for oiling of the shaft 28 for easy operation thereof. Also, an end plate 58 is provided on the opposite end of the shaft 28 from the stop surface 54 to prevent unintended withdrawal of the shaft from the remainder of the device. This plate normally is held on by a screw (unnumbered).

OPERATION OF THE DEVICE

In operation the device is mounted on the lathe as shown in FIG. 1 with the stop surface 54 of the shaft 28 on the path of travel of the carriage 12. The device is capable of setting six different stop positions of the carriage, these different positions being dependent upon the positions of adjustment of the stop screws 38. To set the various positions one of the stop screws is selected as the initial stop setting of the machine. The shaft 28 is then moved axially to the position shown in solid lines in FIG. 7 and rotated until the stop surface 48 on the collar 44 is aligned with the screw selected for the initial setting. The detenting mechanism will detent the shaft 28 in this position and it can then be moved axially to the position shown in phantom outline in FIG. 7 with the selected screw 38 abutting the stop surface 48. If any of the other five screws extend a greater distance from the spindle 24 than the selected screw 38, they will extend through their respective aligned opening 46 in the collar 44. With the stop surface 48 of the collar 44 in engagement with the selected screws 38, this screw is rotated by means of a screwdriver in the screwdriver slot 39, with the stop surface 48 being pressed against the end of the screw 38 until the stop surface 54 of the shaft 28 is positioned at the exact position to engage the carriage 12 of the lathe to limit its travel to the exact position desired. This then constitutes the first setting and first stop setting of the device. The shaft 28 is then moved axially again to the position shown in FIG. 7 and rotated one groove rotation, either clockwise or counterclockwise, and pushed in again axially. This will bring the stop surface 48 into abuttment with the next adjacent stop screw 38 and this is then set in the same manner to define the next stop position of the carriage 12. This is continued until all six screws are set, defining six different positions of the carriage.

In use, then, the shaft 28 is then pulled to the position shown in FIG. 7 and rotated and indexed to the desired stop position defined by the abutment of the stop surface 48 and the desired stop screw 38. With this arrangement the shaft 28 is never orbited, but rather remains in the same exact position with respect to the carriage. Further, the detenting provides an exact location which snaps in on each movement so that there are discrete incremental movements of the shaft to each of the selected positions. In all cases, however, the stop surface 54 is the only surface that acts as the stop surface in all of the different positions, this surface lying on the axis of the shaft 28 being movable axially to define the stop location but not circumferentially or radially. Further, stop surface 48 on the collar 44 is the only stop surface that coacts against each of the screws, this being movable axially to the desired stop screw 38.

Thus there is provided a relatively simple, discretely adjustable multi-position carriage stop device which will accurately and quickly locate the stop positions of a carriage in a plurality of selected positions.

I claim:
1. A multi-position carriage stop for a lathe comprising,
   a stationery spindle,
   means to mount said spindle on the lathe,
   a stop shaft mounted on said spindle for axial and rotational movement,
   said shaft having stop surface means centered on the axis of rotation thereof positioned in the path of the carriage of the lathe when the device is mounted on the lathe,
   cooperating means carried by said spindle and said shaft to selectively change the axial position of the shaft with respect to the spindle dependent upon the rotational position of said shaft,
   said cooperating means including axially adjustable means comprising a plurality of circumferentially and radially spaced stop screws positioned around the shaft,
   whereby by rotation of the shaft the stop position of the carriage can be changed,
   said cooperating means include said axial adjustable means mounted on said spindle,
   said cooperating means further including a collar carried by the shaft and having an engagement surface means disposed to coact with a selected one of said stop screws.

2. The invention as defined in claim 1 further characterized by said collar having openings therethrough being one less in number than the number of stop screws, and being alignable therewith and of a size to allow the stop screws to pass therethrough, said collar having said engagement surface means disposed to align with a different one of said stop screws depending upon the relative rotational position of said shaft.

3. The invention as defined in claim 1 further characterized by detent means to selectively detent said shaft in any one of a discrete number of relative rotational positions.

4. The invention as defined in claim 3 further characterized by said detent means including biased ball means carried by said spindle and longitudinal grooves on said shaft coactable with said ball means.

5. The invention as defined in claim 1 further characterized by ball plunger screws disposed to coact with said stop screws to prevent unintended rotation thereof.

* * * * *